(12) United States Patent
Nabeiro et al.

(10) Patent No.: US 9,487,347 B2
(45) Date of Patent: Nov. 8, 2016

(54) CAPSULE WITH CONTROLLED OPENING, PROCESS AND DEVICE FOR OPERATING THE CAPSULE

(75) Inventors: Rui Miguel Nabeiro, Campo Maior (PT); Daniel Freire Falcão T. Caramelo, Lisbon (PT)

(73) Assignee: NOVADELTA-COMÉRCIO E INDÚSTRIA DE CAFÉS S.A, Lisbon (PT)

( * ) Notice: Subject to any disclaimer, the term of this patent is extended or adjusted under 35 U.S.C. 154(b) by 130 days.

(21) Appl. No.: 14/008,361

(22) PCT Filed: Mar. 30, 2012

(86) PCT No.: PCT/PT2012/000011
§ 371 (c)(1),
(2), (4) Date: Sep. 27, 2013

(87) PCT Pub. No.: WO2012/134312
PCT Pub. Date: Oct. 4, 2012

(65) Prior Publication Data
US 2014/0017372 A1    Jan. 16, 2014

(30) Foreign Application Priority Data
Mar. 30, 2011   (PT) .......................................... 105598

(51) Int. Cl.
*B65D 85/804* (2006.01)
*A47J 31/36* (2006.01)
(Continued)

(52) U.S. Cl.
CPC ............. *B65D 85/8043* (2013.01); *A23F 3/16* (2013.01); *A23F 5/24* (2013.01); *A47J 31/368* (2013.01); *A47J 31/369* (2013.01); *A47J 31/3676* (2013.01); *A47J 31/3685* (2013.01)

(58) Field of Classification Search
CPC .. A47J 31/368; A47J 31/369; A47J 31/3676; A47J 31/3685; A23F 3/16; A23F 5/24; B65D 85/8043
See application file for complete search history.

(56) References Cited

U.S. PATENT DOCUMENTS 7,947,316 B2 *  5/2011  Kirschner .......... B65D 85/8043
                                                 426/426
7,964,230 B2 *  6/2011  Kirschner .......... B65D 85/8043
                                                 426/433
(Continued)

FOREIGN PATENT DOCUMENTS

DE   10 2010 030988 A1   1/2012
EP       2 210 826 A1    7/2010
(Continued)

OTHER PUBLICATIONS

International Search Report for PCT/PT2012/000011 dated Oct. 29, 2012.

*Primary Examiner* — Anthony Weier
(74) *Attorney, Agent, or Firm* — Sughrue Mion, PLLC

(57) ABSTRACT

The present invention refers to a capsule containing at least one aromatic substance for producing a beverage by means of its crossing by a pressurized fluid flow, and having at least one controlled opening element retained in a removable manner at least in one zone of the capsule facing the flow upstream and/or downstream. Said controlled opening element, by means of applying at least one certain actuation force exerted by a respective extraction device, may be displaced in at least linear or rotating fashion from an initial retaining position, that produces the airtight closure of the capsule, to at least one following position, thereby releasing at least one section of flow passageway of previously defined configuration and dimension in view of an optimized flow distribution inside said capsule.

16 Claims, 5 Drawing Sheets

(51) Int. Cl.
*A23F 3/16* (2006.01)
*A23F 5/24* (2006.01)

(56) References Cited

U.S. PATENT DOCUMENTS

| | | | |
|---|---|---|---|
| 8,399,035 B2* | 3/2013 | Kirschner | B65D 85/8043 426/112 |
| 2003/0056661 A1* | 3/2003 | Hu | A47J 31/0668 99/495 |
| 2008/0028946 A1 | 2/2008 | Kirschner et al. | |
| 2008/0028948 A1* | 2/2008 | Kirschner | B65D 85/8043 99/295 |
| 2010/0154644 A1 | 6/2010 | Skalski et al. | |
| 2010/0154647 A1* | 6/2010 | Skalski | A47J 31/0668 99/290 |
| 2010/0282091 A1* | 11/2010 | Doleac | B65D 85/8043 99/295 |

FOREIGN PATENT DOCUMENTS

| | | |
|---|---|---|
| WO | 2010/137947 A1 | 12/2010 |
| WO | 2011/035942 A1 | 3/2011 |
| WO | 2011/138405 A1 | 11/2011 |
| WO | 2012-004256 A1 | 1/2012 |

* cited by examiner

Figure 1a
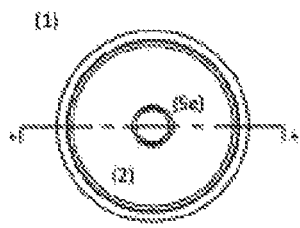
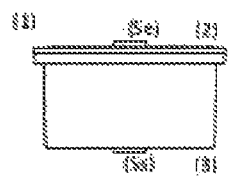
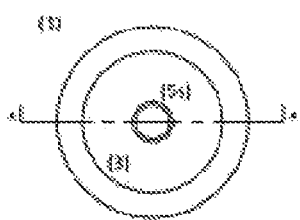
Figure 1b
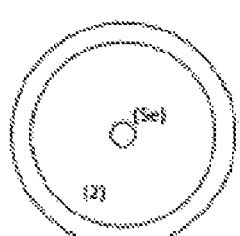
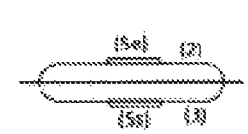
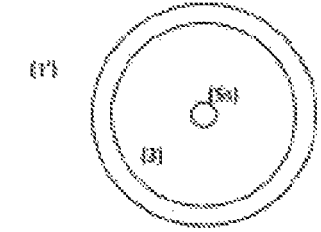
Figure 2a
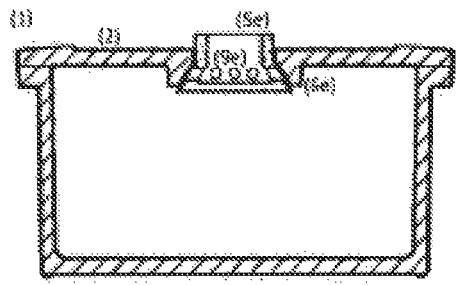
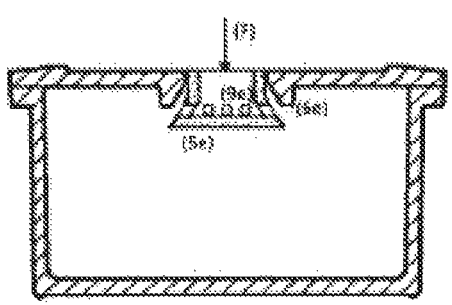
Figure 2b
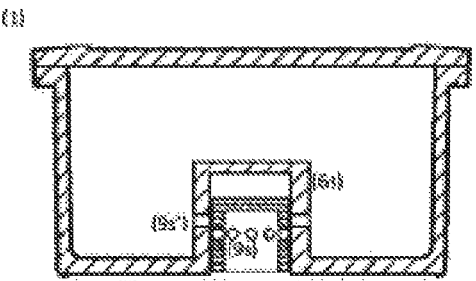
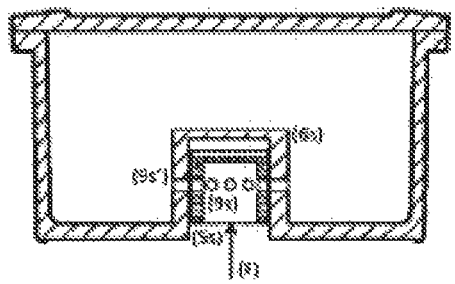

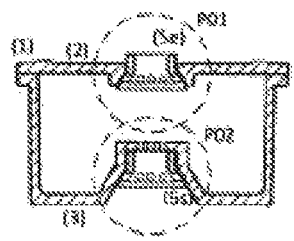
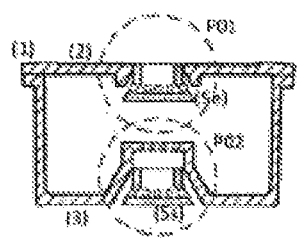
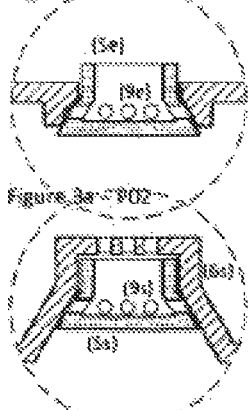
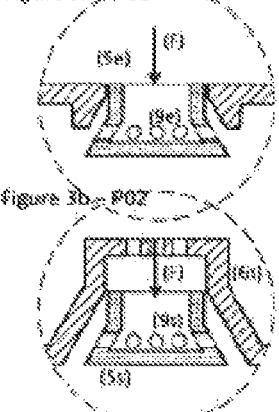
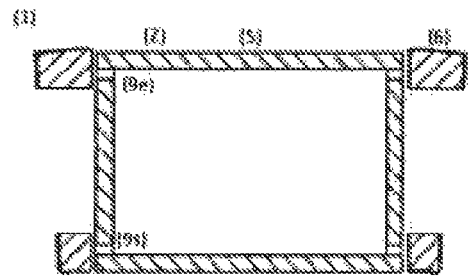
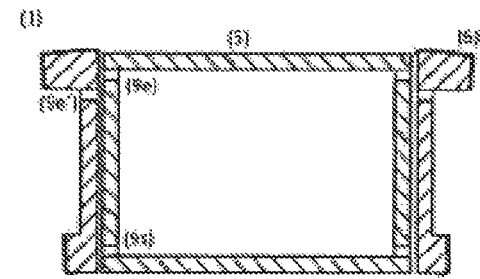
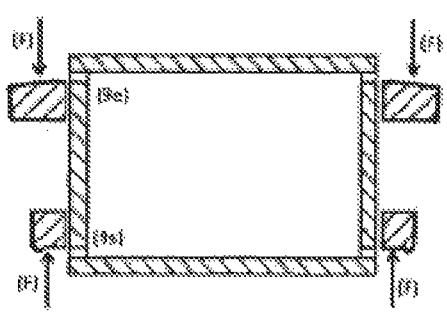
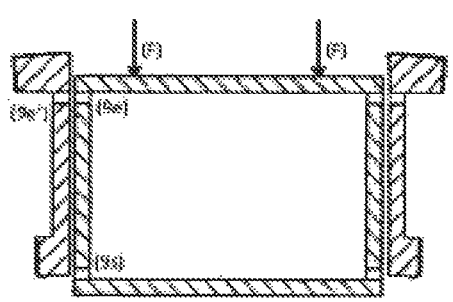

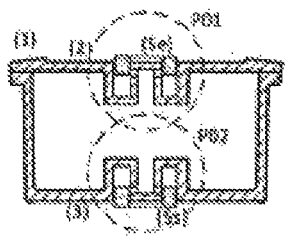
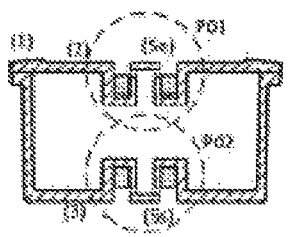
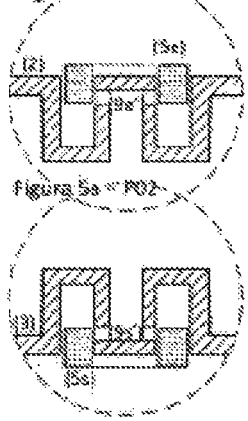
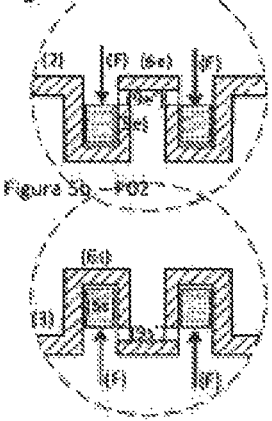
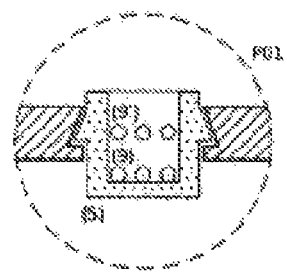
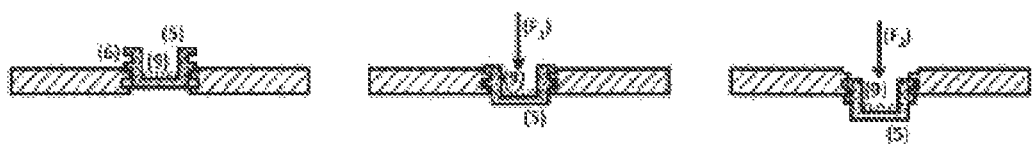

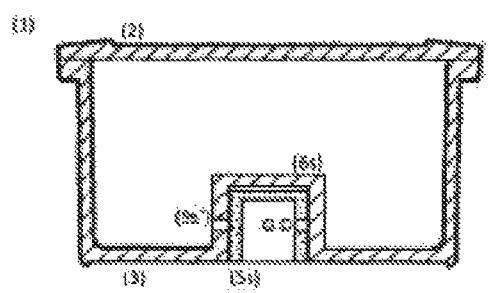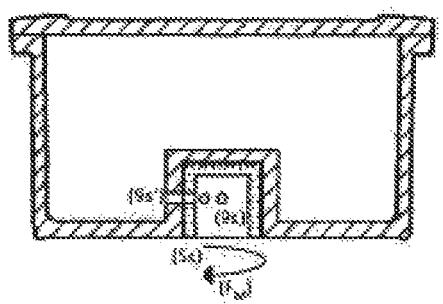

CAPSULE WITH CONTROLLED OPENING, PROCESS AND DEVICE FOR OPERATING THE CAPSULE

CROSS REFERENCE TO RELATED APPLICATIONS

This application is a National Stage of International Application No. PCT/PT2012/000011 filed Mar. 30, 2012, claiming priority based on Portuguese Patent Application No. 105598 filed Mar. 30, 2011, the contents of all of which are incorporated herein by reference in their entirety.

FIELD OF THE INVENTION

The present invention refers to the field of capsules for aromatic substances used for the preparation of beverages by extraction, by means of its crossing by a pressurized fluid flow, in general, and to the field of capsules for obtaining coffee of the espresso type, in particular.

The present invention further refers to a process and device for the operation of said capsule.

BACKGROUND OF THE INVENTION

The extraction of aromatic substances inside of a capsule by means of a pressurized fluid flow has a determinant importance upon the quality of the resulting beverage. In what refers to the entry and exit of the flow, the solution usually applied in the prior art relates to a certain form of rupture of a construction material used in at least one certain zone of the capsule. Any form of rupture of a construction material, leas as a rule to a different outcome, notably in terms of the resulting configuration of the section and area of the passageway made available for entry or exit of the flow.

In particular, it is important to consider the configuration and distribution of the flow at the entry, so as to spread across the volume occupied by the aromatic substance in the most effective possible way. In this respect, both the section of the passageway as the path of the flow, immediately after entering or before leaving the capsule, have an overriding influence upon the attraction efficacy and several other properties of the beverage obtained. In particular, maximizing the area distribution of the pressurized flow right at the entry, so as to cross the biggest possible fraction of the volume of aromatic substance contained in the capsule, presents several advantages.

Moreover, it is known the advantage associated with the flow remaining during a certain period of time inside the capsule, usually controlled by the hydraulic force thus generated, notably when the latter is sufficient to actuate mechanical means of rupture or perforation of such a zone of the capsule, external or internal to the capsule. In this respect, it will be advantageous to provide a simpler solution in construction terms, for a space of temporary flow retention, and bigger control upon the flow exit conditions. According to another aspect, in many cases of resorting to internal perforation means, it is known the need to use one exterior element in this zone, so as to ensure the airtightness of the capsule, which results disadvantageous in terms of production costs and simplicity of recycling of the capsules.

Documents 2008/087099 A2, WO 2005/020769 A1 and EP 1243210 A1 disclose capsules according to the aforementioned technical field. Patent EP 1826148 B1 discloses an element disposed at the entry of a capsule and dividing the fluid flow upstream into several fluxes distributed and oriented so as to attain a more effective distribution of the fluid flow within the volume occupied by the aromatic substance.

GENERAL DESCRIPTION OF THE INVENTION

The goal of the present invention is to make available a capsule that allows a bigger control upon the flow conditions at the entry and exit, as well upon the distribution of said flow inside the capsule, in particular including the configuration and dimension of the sections of flow passageways at the entry and exit of the capsule, so as to increase the efficacy of the extraction of the aromatic substance in its interior.

Yet another goal of the present invention is to eliminate the need for using different construction materials outside of the capsule, such as for example aluminium, so as to ensure substantial airtightness conditions thereof.

Within the scope of the present invention, by "capsule" one should understand a recipient defining an interior volume for collecting an aromatic substance, presenting at least one zone facing the flow upstream, configured for example in the form of a substantially cylindrical box, or in the form of a shell, and produced in a substantially rigid or substantially flexible material, and substantially gastight or not.

The goals above are solved according to the invention by means of a capsule built by at least one construction element that defines at least one zone of capsule facing the flow upstream, preferentially also a zone of capsule facing the flow downstream, and including at least one controlled opening element, retained in a removable manner in a respective element fixture disposed in the zone facing the flow upstream and/or in the zone facing the flow downstream, respectively, so that by means of applying at least one actuation force, preferentially previously defined, upon a respective controlled opening element, the latter is displaced from a initial position of retention to a following position of retention in a respective element fixture, thereby releasing at least one previously defined section of flow passageway, provided in the controlled opening element end/or in respective element fixture.

The present invention thus provides sections of flow passageways, at the entry and/or at the exit of the capsule, whose configuration and dimension may be previously defined and whose instant of opening may be controlled with high reliability by means of the application of a respective actuation force, without provoking any rupture or discontinuity of any construction material of the capsule. In particular, these sections of flow passageways are previously defined in the controlled opening elements and/or respective element fixtures, so that they may be differently configured in view of the required type of flow pattern, for example according to the type of aromatic substance, without having for such purpose to vary remanding construction elements of the capsule.

In a preferred embodiment of the capsule according to the invention, the latter presents at least one controlled opening element in the zone of the capsule facing the flow upstream, preferentially also in the zone facing the flow downstream, disposed in each case preferentially in a substantially centred manner. According to a preferred embodiment, said controlled opening element, when in a initial position of retention and/or in a following position of retention, is retained preferentially by means of at least one friction union and/or of an union by means of positive locking, in at least one respective element fixture.

According to another inventive aspect, said section of flow passageway is provided by at least one, preferentially a plurality of passageways and/or by a region occupied by a liquids permeable material and/or with filtering effect. In particular, in view of maximizing the flow distribution at the entry, along the direction transversal to the prevailing flow direction through the capsule, the controlled opening element and/or respective element fixture, present several passageways, preferentially disposed on its side faces, whereby said passageways are un-obstructed or result in fluid communication with each other, by means of the displacement of the controlled opening element. According to experiments that have been carried out, this embodiment presents a substantial advantage when compared to the introduction of the flow concentrated in the central zone of the capsule. Moreover, the use of a plurality of passageways in the controlled opening element and/or in a respective element fixture, allows a diversity of particular options in terms of the distribution and configuration of said passageways, both at the entry as at the exit of the capsule, and, henceforth, of the flow patterns developing inside the capsule.

According to another aspect of the invention, the displacement of the controlled opening element releases an increasing section of flow passageway, disposed substantially along a prevailing flow direction and/or along a radial direction. In a preferred embodiment, the several passageways are disposed preferentially in a symmetrical manner along the perimeter of the controlled opening element and/or respective element fixture.

According to another inventive aspect, the, at least one, section of flow passageway is released as a result of a respective displacement at least linear or rotating, preferentially of a linear and rotating displacement, by the controlled opening element. Thus, it is possible to configure the passageways in such a way that it results a section of flow passageway with a certain radial evolution, leading to a corresponding flow distribution inside the capsule. This aspect is particularly advantageous in the case that the pressurized fluid flow crosses the capsule (prevailing flow direction) along a substantially horizontal direction.

In this respect, in a particularly preferred embodiment, the passageways are provided in such a number, distribution, including radial distribution, dimension and spatial orientation, that the displacement of the controlled opening element distributes the pressurized fluid flow to at least one distance of reach, preferentially in at least two distances of reach, along a radial direction relatively to the perimeter of the section or passageway.

In another preferred embodiment, the passageways of the controlled opening element and/or of a respective element fixture, present a dimension and/or format that varies in each case along the radial direction across the perimeter of the section of flow passageway. In a particularly preferred embodiment, the ways are disposed in a symmetrical manner, so as to generate a certain prevailing flow path, for example substantially circular downwards inside the aromatic substance, when the capsule is placed in such an extraction position that the prevailing flow direction is substantially horizontal. Moreover, it is preferred when the passageways of the controlled opening element and/or of a respective element fixture, present a dimension and/or format that varies in each case at least along the respective perimeter.

It is thus provided a sat of advantageous options that allow a substantial control upon the configuration of the section of passageway, moment of opening and associated energy loss, as wall as prevailing flow path followed by the pressurized flow as it enters inside the capsule according to the invention. Moreover, there is the possibility of exerting a substantial influence upon the flow distribution pattern at the entry, and inherently, the following internal evolution of the flow inside the capsule, and henceforth, the efficacy of extraction of the respective aromatic substance.

In a capsule according to the invention, is preferred when the controlled opening element is configured in a substantially tubular form, or in a ring form, preferentially of circular cross section. In a preferred embodiment, the end-side of the controlled opening element facing the flow upstream is provided open and the end-side facing the flow downstream is provided closed.

According to another preferred embodiment of the invention, the controlled opening element is disposed in the capsule so as to initially retain a certain amount of pressurized fluid flow in its interior, at least until it is displaced to a following retention position. In particular, it is preferred when the controlled opening element presents a configuration of the cone type in its end on the side of the upstream flow.

According to tests that have been carried out, it came out as advantageous when the height of the controlled opening element is previously dimensioned so that the displacement of the controlled opening element out of an initial position of retention requires applying a certain actuation force during at least a certain period of time. In particular, in the case of the entry of the flow to be carried out in the zone of capsule facing the flow upstream, the height of the respective controlled opening element may be previously dimensioned so as to, by means of applying a certain actuation force, displace the controlled opening element out of its initial position of retention to a following position of retention, in which for example it is next to the surface of the aromatic substance inside the capsule.

According to another preferred embodiment, it may be provided at least one liquid permeable material, preferentially with filtering effect, in the open end-side facing the flow upstream, of the controlled opening element disposed in the zone facing the flow downstream. One herewith avoids the need for using filtering elements directly in the exit of the flow to the outside of the capsule.

Yet another goal of the present invention is to provide a process for operating a capsule according to the present invention, such that said process takes place with a high degree of control upon the condition in general, and the distribution and evolution, in particular, of the pressurized flow of fluid at the entry and at the exit of said capsule.

The aforementioned goal is solved by means of a process for operating a capsule according to the present invention, comprising the steps of introducing a capsule according to the invention into an extraction chamber, fixating the capsule in the extraction chamber by means of mechanical tightening, notably between an infusion head and an infusion discharge, injection of a fluid flow, under a previously defined pressure and period of time through the infusion head, so that by means of the mechanical tightening of the capsule, the infusion head exerts a mechanical actuation force upon the, at least one, controlled opening element retained in removable manner in the zone of capsule facing the flow upstream, so that the, at least one, controlled opening element is displaced in a linear and/or rotating movement, from an initial position of retention to a following position of retention. It is preferred when in this following position of retention, it is released at least one certain section of flow passageway, at least through the zone facing the flow upstream.

According to a preferred embodiment, by means of mechanical tightening of the capsule, the infusion discharge exerts a mechanical actuation force upon the, at least one, controlled opening element disposed on the zone of capsule facing the flow downstream, so that the letter is displaced in a linear and/or rotating movement, from the initial position of retention to a following position of retention, this way releasing at least one section of flow passageway through the zone facing the flow downstream.

According to another preferred embodiment, after the beginning of the injection of the pressurized flow of fluid, the latter is immediately introduced inside the capsule through the, at least one, passageway of the controlled opening element and/or respective element fixture.

According to another preferred embodiment, the pressurized flow of fluid initially accumulates in the controlled opening element and thereby exerts an increasing hydraulic pressure upon the controlled opening element, until reaching such a value that provokes the displacement of the latter from an initial position of retention to a following position of retention. Alternatively, after crossing the capsule, the pressurized flow of fluid is immediately discharged to the outside of the capsule through the passageways of the, at least one, controlled opening element and/or respective element fixture.

The present invention further proposes a device for using a capsule according to the invention, characterized in that it comprises at least one chamber of extraction for carrying out the process according to the invention.

DESCRIPTION OF THE FIGURES

The invention shall now be explained in greater detail based upon preferred embodiments thereof and on the schematic representation included in the attached Figures. The Figures show:

FIGS. 1a-1b: exterior views of two embodiments of a capsule according to the invention, including in each case one controlled opening element;

FIGS. 2a-2b: views in cut, according to the plane AA in FIG. 1, of a first set of embodiments of a controlled opening element in a capsule according to the invention;

FIGS. 3a-3b: detail views of a controlled opening element in a capsule according to the embodiments of FIG. 2, in an initial position (A) and in a following position (B);

FIGS. 4a-4b: views in cut, along plane AA of FIGS. 1a-1b, of a second set of embodiments of a controlled opening element in a capsule according to the invention;

FIGS. 5a-5b: detail views of a controlled opening element in a capsule according to the embodiments of FIG. 4, in an initial position (A) and in a following position (B);

FIGS. 6a-6b: details of embodiments of the retention of a controlled opening element (5) in a capsule according to the invention, with release of section of passageway by successively applying two actuation forces, respectively;

FIGS. 9a-9b: views in side cut of a capsule according to the invention, and in front cut of a controlled opening element in engagement and rotating movement with a respective fluid injection (11) of the extraction device (10) for processing of said capsule.

DETAILED DESCRIPTION OF THE INVENTION

Figure 7A:
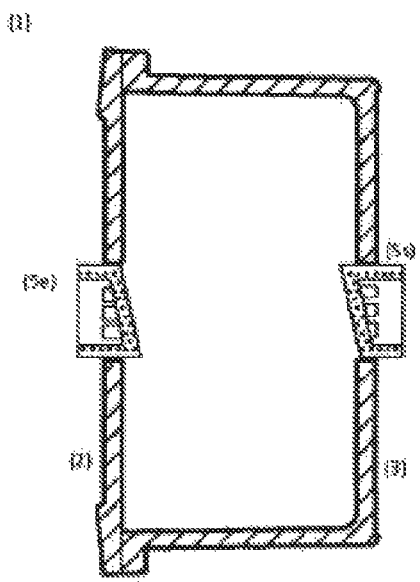
FIGS. 7a-7b: views in cut, along plane AA, of an embodiment of a controlled opening element in a capsule according to the invention, in an initial position (A) of retention and in a following position (B) of retention, respectively.

FIGS. 1a and 1b respectively present embodiments of a recipient of the type capsule (1) and of the type pod (1') according to the invention (henceforth jointly designated by "capsule"), in plan view from above, in side view, and in plan view from underneath, successively from top to bottom. Both capsules (1, 1') are built by at least on construction element defining at least one zone (2) of capsule facing the flow upstream, preferentially also a zone (3) of capsule facing the flow downstream, and defining an interior volume containing at least one aromatic substance, for obtaining a beverage by means of its crossing by a pressurized fluid flow. The capsule (1, 1') further include at least one controlled opening element (5) retained in an initial position (A) of closing, by means of at least one removable union with a corresponding element fixture (6) provided in each case in the zone (2) of capsule facing the flow upstream and/or in the zone (3) of capsule facing the flow downstream.

FIGS. 2a-2b and 3a-3b illustrate a first set of embodiments of a capsule (1, 1') according to the invention.

FIGS. 2a-2b correspond to a first embodiment of the controlled opening elements (5) disposed in zone (2) facing the flow upstream (FIG. 2a) and zone (3) facing the flow downstream (FIG. 2b). Capsule (1) present in this case a controlled opening element (5e) disposed in a respective element fixture (6e) in zone (2) facing the flow upstream (FIG. 2a), and/or a controlled opening element (5s) disposed in a respective element fixture (6s) in zone (3) facing the flow downstream (FIG. 2b). The controlled opening element (5e, 5s) is in each case retained in a removable manner, preferentially by means of friction union or by means of a positive locking, in a respective element fixture (6e, 6s) provided in the construction element in the zone (2, 3) facing upstream/downstream. This removable retention is previously dimensioned so that only by applying a certain actuation force (F) upon the controlled opening element (5), the latter being displaced from the initial position (A) of retention to a following position (B) of retention, thereby releasing at least one certain section of flow passageway allowing the pressurized flow of fluid to pass to a zone of flow downstream.

In the embodiment of FIG. 2a, the controlled opening element (5e) is configured in a substantially tubular and/or conic form, preferentially of substantially circular cross-section, presenting a plurality of passageways (9e) preferentially disposed in the proximity of the extremity facing the flow downstream, preferentially distributed uniformly along the perimeter of said extremity. The respective element fixture (6e) is provided as a support of displacement with such an extension that allows releasing said passageways (9e) by means of applying a certain actuation force (F) upon the controlled opening element (5e).

In the embodiment of FIG. 2b, the section of flow passage is defined by passageways (9s) provided in the controlled opening element (5s), together with passageways (9s') provided in the respective element fixture (6s). Alternatively, or additionally, the section of flow passage might be provided by means of a liquid permeable material and/or with filtering effect. The element fixture (6s) is in this case provided as a re-entrance in the construction element on the side facing the flow downstream, preferentially with a substantially tubular format and so that the controlled opening element (5s) may be displaced along at least part thereof. The section of flow passage is released when the respective passageways (9s, 9s') are substantially aligned with each other. This position preferentially corresponds to a following position (B) of retention of the controlled open element (5s).

FIGS. 3a-3b show a capsule (1) according to the invention in which the controlled opening elements (5e, 5s) are displaced from a initial position (A) of closing (FIG. 3a) to a final position (B) of opening (FIG. 3b). As one can recognize from the detail drawings 01 and 02, represented below, representing the top zone (2) of the capsule (1), the passageways (9) are completely obstructed when in an initial position (A) of closing. The capsule (1) is closed in an airtight manner. Thus, the passageways (9) may only be un-obstructed by means of displacement of the controlled opening element (5e, 5s) at least to an open position (B). This solution presents several advantages, notably in terms of reducing the pressure loss of the pressurized flow of fluid as it enters the capsule (1), and of a better initial distribution/dispersion of the flow within the volume of aromatic substance being crossed. Both of these aspects contribute in a substantial way to a bigger efficacy of extraction.

FIGS. 4a and 4b represent two embodiments, in each case in an initial position of closing (top drawing) and in a following position of opening (bottom drawing), in which the controlled opening element (5) substantially defines the interior volume of the capsule (1, 1') and the element fixture (6) works as structural reinforcement element and as blocking/releasing of at least one section of flow passageway (in this case defined by a plurality of passageways (9e, 9s) provided at least in the controlled opening element (5)). By way of illustrative example as it results form the drawings, said section of passageway is released by means of the application of, for example, two actuation forces (F), eventually of approximate dimension, in opposite directions, upon respective element fixture (6e, 6s) that as a result are displaced (while the controlled opening element (5) is kept immobilized), thereby releasing passageways (9e, 9s) (FIG. 4a), or by means of the application of at least one actuation force (A) upon the controlled opening element (5) (while the element fixtures (6e, 6s) are kept immobilized), thereby releasing passageways (9e, 9e', 9s) of flow entry and exit (FIG. 4b).

FIGS. 5a-5b schematically represent another preferred embodiment of the capsule (1) according to the invention, in an initial position (FIG. 5a) and in a following position of release of a section of flow passageway (FIG. 5b), and respective details of the side facing the flow upstream (P01) and downstream (P02). In this case, the controlled opening element (5) is configured as a female type element, for example of ring configuration, and not provided with a section of flow passageway, that is initially retained in a removable manner in an element fixture (6) configured in a corresponding manner as male type element, for example of tubular form, and provided in the construction element of the zone (2, 3) facing upstream/downstream. The female type element (5) is dimensioned and provided so that it gets retained in positive locking, or in friction union, as for example in a fitting under pressure, in the male type element (6). This male type element presents passageways (9) that are thereby initially obstructed by the female type element, notably when the latter is in an initial situation (A). By means of applying a certain actuation force (F), the female type element (5e, 5s) is displaced since said initial situation (A) of closing to a final situation (B) of opening in which it un-obstructs said passageways (9).

FIGS. 6a-6b illustrate embodiments with the option of control upon the instant when the section of passage is released and upon the dimension of the latter. Thus, according to another preferred embodiment of the invention (FIG. 6a), the section of flow passage provided in the opening element (5) and/or in a respective element fixture (6) is only released by means of applying two successive actuation forces ($F_1$, $F_2$). According to another embodiment (FIG. 6b), the section of flow passage includes at least two sub-sections disposed so that a first sub-section (e.g., first level of flow ways (9)—see detail 01) is released with the displacement of the controlled opening element (5) from a position of retention, to a second, and a second sub-section of passage (e.g., second level of passageways (9')) is released with the displacement from said second position of retention to a following position of retention.

The same construction of capsule (1) may thus be used for different types of aromatic substances, only repairing varying the configuration of the controlled opening element (5), notably in terms of dimension and instant of releasing the section of passage, that is, for example, of the passageways and/or type of liquid permeable material and/or with filtering effect.

Figure 7B:
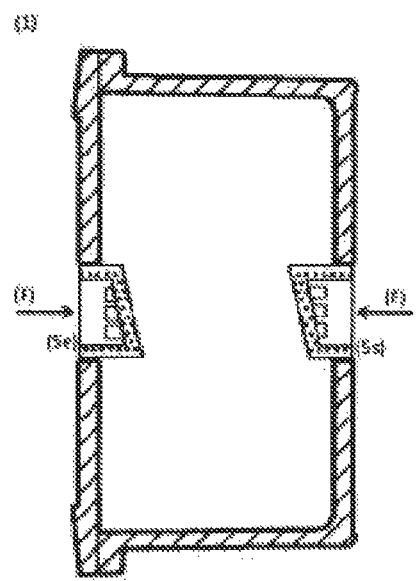

FIGS. 7a-7b illustrate an initial position and a following position, respectively, of a preferred embodiment of the controlled opening element in a capsule according to the invention, regarded as particularly advantageous to induce a certain flow pattern when said capsule (1) is processed in a position in which the pressurized flow flows along a substantially horizontal direction. In particular, the section of flow passage is configured with an asymmetric format (in the present case, illustrated as a way of example, through the passageways (9e, 9s) of different dimension and configuration), previously defined so as to induce a flow with bigger screening of the volume occupied by the aromatic substance, for example starting from the interior zone of controlled opening element (5e) at the entry, and, inversely from the superior zone of the Controlled opening element (5s) at the exit of the capsule (1).

Figure 8A:
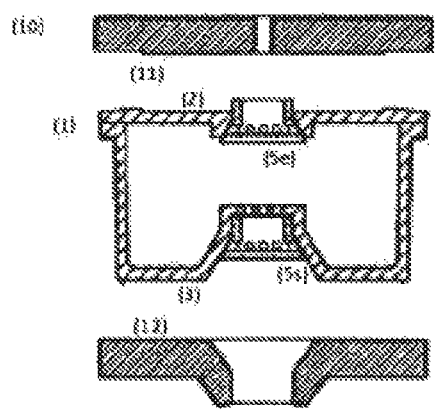
FIGS. 8a-8b: Schematic diagrams representative of the evolution of the method of processing according to the invention, in steps corresponding to an initial position (A) and a following position (B), corresponding to the position of extraction in an extraction device of said capsule, respectively.
Figure 8B:
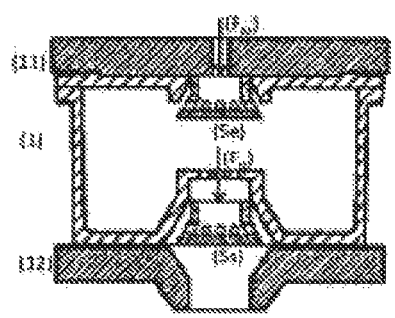

FIGS. 8a-8b are schematic representations of an extraction chamber (10) in a device for the processing of a capsule (1, 1') according to the invention, in an initial position (FIG. 8a) and in an extraction position (FIG. 8b). The capsule (1, 1') is inserted into this extraction chamber (10) so that the zone (2) of capsule facing the flow upstream is oriented to, and preferentially the controlled opening element (5e) is substantially aligned with, a fluid injection (11), whereas the zone (3) facing the flow downstream is oriented to, and preferentially the controlled opening element (5s) is substantially aligned with, a infusion discharge (12). According to a preferred embodiment of the method according to the invention, the capsule (1, 1') is initially fixated by means of mechanical clamping between the fluid injection (11) and the infusion discharge (12) (FIG. 8b). By means of this mechanical clamping, an actuation force (F) is exerted by the fluid injection (11) upon the controlled opening element (5e) so that the latter is displaced from its initial position (A) of retention to a following position (B) of retention. In the present case the passageways (9e) are therefore already un-obstructed when the supply of the pressurized flow of processing fluid starts.

In another preferred embodiment, and by means of a corresponding configuration of the fluid injection (11) and infusion discharge (12), this mechanical actuation force ($F_H$) may be used to displace both the controlled opening elements (5e, 5s) from a respective initial position (A) of closing to a following position (B) of retention. According to another preferred embodiment, the mechanical actuation force ($F_H$) exerted at the time of fixating the capsule (1) in the extraction chamber (10), may be complemented by an hydraulic pressure force ($F_H$), exerted by the pressurized flow of fluid, to carry out at least the displacement of the controlled opening element (5e).

FIGS. 9a and 9b illustrate yet another preferred embodiment of the method according to the present invention, carried out as illustrative example by a controlled opening element (5s) retained in a removable manner in the zone (3) facing the flow downstream.

As it results from the views in cut of FIG. 9a, said controlled opening element (5s) is provided with a plurality of passageways (9s), in this case distributed along only part of the perimeter of the former (top drawing). In this case the controlled opening element (5s) is actuated by a movement at least of rotation, preferentially exerted by the fluid injection (11), so that it is displaced in such an extension along a radial direction, until said passageways (9s) coincide with the passageways (9s') provided in the element fixture (5s) (bottom drawing), thus allowing a fluid crossing communication.

As one may observe in FIG. 9b, the radial distribution of passageways (9s, 9s') disposed in the controlled opening element (5s) and infusion discharge (12), may be advantageously defined so that to increasing rotating angles of the latter (12) inside the former (5s), corresponds a bigger resulting dimension of the section of flow passage.

The invention claimed is:

1. A capsule containing at least one aromatic substance for production of a beverage due to a pressurized fluid flow crossing through said capsule, comprising:
    at least one construction element defining a zone of the capsule facing the flow upstream, and a zone of the capsule facing the flow downstream, and
    a controlled opening element retained in a movable manner within a respective element fixture, in at least one of said zone facing the flow upstream and in said zone facing the flow downstream, wherein each of said controlled opening element and said respective element fixture include at least one flow passageway comprising a predetermined sized opening formed therein, and
    wherein said controlled opening element is configured to receive at least one actuation force that displaces said controlled opening element from an initial position (A) of retention in the respective element fixture to a following position (B) of retention in the respective element fixture, thereby moving at least one section of said flow passageway provided in said controlled opening element with respect to at least one section of said flow passageway provided in said respective element fixture, and
    wherein in the initial position (A) the controlled opening element blocks the flow passageway in said respective element fixture, and in the following position (B) the controlled opening element unblocks the flow passageway in said respective element fixture.

2. The capsule according to claim 1, wherein the displacement of the controlled opening element releases an increasing section of passageway provided by said flow passageway, in at least one of along the prevailing flow direction or along a transverse direction.

3. The capsule according to claim 1, wherein the section of passageway provided by said flow passageway is released as a result of at least one of a respective linear or a rotating movement by the controlled opening element.

4. The capsule according to claim 1, wherein the section of flow passageway is provided by at least one flow passageway.

5. The capsule according to claim 1, wherein at least one of the controlled opening element and respective element fixture presents several passageways that are un-obstructed or get in fluid communication with each other by means of the displacement of the respective controlled opening element from the initial position (A) of retention to the following position (B) of retention in the respective element fixture.

6. The capsule according to claim 1, wherein the flow passageways disposed in the zone facing the flow upstream, are provided in a number, distribution, including radial distribution, dimension and spatial orientation such that the pressurized flow of fluid is projected to at least one distance along the radial direction of the capsule, and distributed in uniform or substantially asymmetric way relative to a perimeter of the section of flow passageway.

7. The capsule according to claim 1, wherein the flow passageways of at least one of the controlled opening element and the respective element fixture, present a dimension that varies along the respective perimeter.

8. The capsule according to claim 1, wherein the controlled opening element is configured in a substantially tubular form, or in a substantially ring form, including a circular cross section.

9. The capsule according to claim 1, wherein a cross-section of the controlled opening element facing the flow upstream is provided open and a cross-section of the controlled opening element facing the flow downstream is provided closed.

10. The capsule according to claim 1, wherein the controlled opening element is disposed in the capsule so as to collect a certain amount of the pressurized flow of fluid in an interior of said capsule, until said controlled opening element is displaced to the following position (B) of retention in the respective element fixture.

11. A process for operation of a capsule according to claim 1, comprising:
    introducing the capsule in an extraction chamber, whereby said capsule comprises a controlled opening element provided in a respective element fixture, and whereby at least one of said controlled opening element and element fixture present at least one flow passageway,
    fixating said capsule in the extraction chamber, by means of mechanical clamping, between an infusion head and an infusion discharge,
    injecting a fluid flow, under a predetermined pressure and during a period of time through the infusion head,
    wherein by means of the mechanical clamping of the capsule, the infusion head applies such an actuation force upon the controlled opening element disposed in the zone facing the flow upstream, such that the controlled opening element is displaced in at least one of a linear and a rotating movement, from the initial position (A) of retention to the following position (B) of retention in the respective element fixture, thereby releasing a passageway in at least one of said flow passageway provided in at least one of the controlled opening element and respective element fixture.

12. The process according to claim 11, wherein, by means of the mechanical clamping of the capsule, the infusion discharge exerts such an actuation force (F) upon the controlled opening element disposed in the zone facing the flow downstream, that the controlled opening element is displaced in at least one of a linear and a rotating movement, from the initial position (A) of retention to the following position (B) of retention in the respective element fixture.

13. The process according to claim 11,
wherein after beginning of the flow injection of pressurized fluid, the pressurized fluid is immediately introduced inside the capsule through the at least one flow passageway of at least one of the controlled opening element and respective element fixture.

14. The process according to claim 13,
wherein the pressurized fluid flow initially accumulates in the controlled opening element so as to exert an increasing hydraulic pressure upon the controlled opening element, until reaching in each case a value that causes the displacement of the controlled opening element from the initial position (A) of retention to the following position (B) of retention.

15. A device for using a capsule according to claim 1, wherein the device comprises at least one extraction chamber to carry out the process, comprising:
introducing a capsule in an extraction chamber, whereby said capsule comprises a controlled opening element provided in a respective element fixture, and whereby at least one of said controlled opening element and element fixture present at least one flow passageway,
fixing said capsule in the extraction chamber, by means of mechanical clamping, between an infusion head and an infusion discharge,
injecting a fluid flow, under a predetermined pressure and during a period of time through the infusion head,
wherein, by means of the mechanical clamping of the capsule, the infusion head applies such an actuation force (F) upon the controlled opening element disposed in the zone facing the flow upstream, that the latter is displaced in at least one of a linear and rotating movement, from the initial position (A) of retention to the following position (B) of retention in the respective element fixture, thereby releasing a passageway in said at least one flow passageway provided in at least one of the controlled opening element and respective element fixture.

16. A capsule configured to contain an aromatic substance for production of a beverage due to a pressurized fluid flow crossing through said capsule, comprising:
at least one construction element defining a zone of the capsule configured to face the flow upstream and a zone of the capsule configured to face the flow downstream;
a first element fixture disposed in the zone of the capsule configured to face the flow upstream and a second element fixture disposed in the zone of the capsule configured to face the flow downstream;
a first controlled opening element retained in a movable manner in the first element fixture and a second controlled opening element retained in a movable manner in the second element fixture; and
at least one flow passageway defined by at least one of said first and second controlled opening elements or said first and second element fixtures,
wherein said first and second controlled opening elements are configured to displace with respect to said first and second element fixtures, respectively, from an initial position of retention in the respective element fixture to a following position of retention in the respective element fixture, thereby opening at least one section of said flow passageway.

* * * * *